United States Patent
Ji (10) Patent No.: US 12,389,441 B2
(45) Date of Patent: Aug. 12, 2025

(54) RESOURCE SELECTION METHOD AND DEVICE

(71) Applicant: VIVO MOBILE COMMUNICATION CO., LTD., Guangdong (CN)

(72) Inventor: Zichao Ji, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 231 days.

(21) Appl. No.: 17/944,038

(22) Filed: Sep. 13, 2022

(65) Prior Publication Data

US 2023/0007660 A1    Jan. 5, 2023

Related U.S. Application Data

(63) Continuation of application No. PCT/CN2021/082577, filed on Mar. 24, 2021.

(30) Foreign Application Priority Data

Mar. 30, 2020 (CN) .......................... 202010238861.9

(51) Int. Cl.
*H04W 72/02* (2009.01)
*H04W 72/044* (2023.01)
*H04W 72/542* (2023.01)

(52) U.S. Cl.
CPC ......... *H04W 72/542* (2023.01); *H04W 72/02* (2013.01); *H04W 72/044* (2013.01)

(58) Field of Classification Search
CPC ...... H04W 72/00; H04W 72/02; H04W 72/04
USPC .......................................................... 455/464
See application file for complete search history.

(56) References Cited

U.S. PATENT DOCUMENTS

| 2017/0302419 A1 | 10/2017 | Liu et al. | |
| 2018/0279259 A1 | 9/2018 | Gulati et al. | |
| 2020/0029245 A1* | 1/2020 | Khoryaev | H04W 36/22 |
| 2020/0029340 A1* | 1/2020 | He | H04W 72/25 |
| 2020/0260246 A1* | 8/2020 | Tang | H04W 72/0453 |

FOREIGN PATENT DOCUMENTS

| CN | 110858974 A1 | 3/2020 |
| WO | 2019084927 A1 | 5/2019 |

OTHER PUBLICATIONS

Written Opinion for Application No. PCT /CN2021/082577, Dated Jun. 16, 2021, 6 pages.
Second Indian Office Action for Indian Patent Application No. 202217061203 mailed Jun. 16, 2025. 3 pages.
Intel Corporation. Summary #4 for AI 7.2.4.2.2 Mode-2 Resource Allocation. 3GPP TSG RAN WG1 Meeting #98. R1-1909892. Online. Aug. 2019. 34 pages.

(Continued)

*Primary Examiner* — Qutbuddin Ghulamali
(74) *Attorney, Agent, or Firm* — BROOKS KUSHMAN P.C.

(57) ABSTRACT

A resource selection method and a device. The method is applied to user equipment and includes at least one of the following steps: determining a first resource selection window based on a first resource set; determining a first candidate resource set based on the first resource set and a second resource selection window; and selecting target resources based on the first resource set and a second candidate resource set.

17 Claims, 2 Drawing Sheets

(56) References Cited

OTHER PUBLICATIONS

3rd Generation Partnership Project LTE. Evolved Universal Terrestrial Radio Access (E-UTRA); Physical layer procedures (3GPP TS 36.213 version 15.2.0 Release 15). ETSI TS 136 213 V15.2.0. Online. Oct. 2018. 542 pages.
First Singapore Office Action for Singapore Patent Application No. 11202253615Y mailed Jul. 2, 2025. 12 pages.

* cited by examiner

FIG. 3

RESOURCE SELECTION METHOD AND DEVICE

CROSS-REFERENCE TO RELATED APPLICATIONS

This application is a continuation application of International Application No. PCT/CN2021/082577 filed on Mar. 24, 2021, which claims priority to Chinese Patent Application No. 202010238861.9 filed on Mar. 30, 2020, which are incorporated herein by reference in their entireties.

TECHNICAL FIELD

The present invention relates to the field of communications technologies, and in particular, to a resource selection method and a device.

BACKGROUND

In a new radio (NR) technology, NR sidelink (SL) resources are allocated in two modes: one is a scheduled-by-base-station mode (mode 1), and the other is a user equipment UE autonomous resource selection mode (mode 2).

In the scheduled-by-base-station resource allocation mode, a base station determines a sidelink resource to be used by UE for data transmission and notifies transmit (TX) UE of the sidelink resource by using downlink signaling. In the UE autonomous selection resource allocation mode, the UE selects an available transmission resource from a (pre) configured resource pool, and the UE performs channel monitoring before resource selection, selects a resource set with less interference based on a channel monitoring result, and then randomly selects, from the resource set, a resource for transmission. For physical sidelink control channel (PSCCH) and/or physical sidelink shared channel (PSSCH) resource selection, the UE needs to select at least a physical time-frequency resource for PSCCH and/or PSSCH transmission.

However, in the UE autonomous selection resource allocation mode, resources selected by transmit user equipments TX UEs may conflict, which reduces reliability of transmission between UEs.

SUMMARY

According to a first aspect, an embodiment of the present invention provides a resource selection method, applied to user equipment and including at least one of the following steps:

determining a first resource selection window based on a first resource set;
determining a first candidate resource set based on the first resource set and a second resource selection window; and
selecting target resources based on the first resource set and a second candidate resource set.

According to a second aspect, an embodiment of the present invention further provides user equipment, including:

a first processing module, configured to perform at least one of the following steps:
determining a first resource selection window based on a first resource set;
determining a first candidate resource set based on the first resource set and a second resource selection window; and
selecting target resources based on the first resource set and a second candidate resource set.

According to a third aspect, an embodiment of the present invention further provides user equipment, including a processor, a memory, and a computer program stored in the memory and capable of running on the processor. When the computer program is executed by the processor, the steps of the resource selection method described above are implemented.

According to a fourth aspect, an embodiment of the present invention further provides a computer-readable storage medium, where the computer-readable storage medium stores a computer program. When the computer program is executed by a processor, the steps of the resource selection method described above are implemented.

According to a fifth aspect, an embodiment of the present invention provides a computer software product, where the computer software product is stored in a non-volatile storage medium, and when the software product is configured to be executed by at least one processor, the steps of the resource selection method described above are implemented.

According to a sixth aspect, an embodiment of the present invention further provides user equipment, where the user equipment is configured to execute the resource selection method described above.

DETAILED DESCRIPTION

To make the technical problems to be resolved, technical solutions, and advantages of the present invention clearer, the following provides descriptions with reference to accompanying drawings and specific embodiments.

The method in the embodiments of the present invention is applied to user equipment, and the user equipment (UE) may be an access terminal, a subscriber unit, a subscriber station, a mobile station, a mobile, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, an in-vehicle device, or a wearable device.

Figure 1:
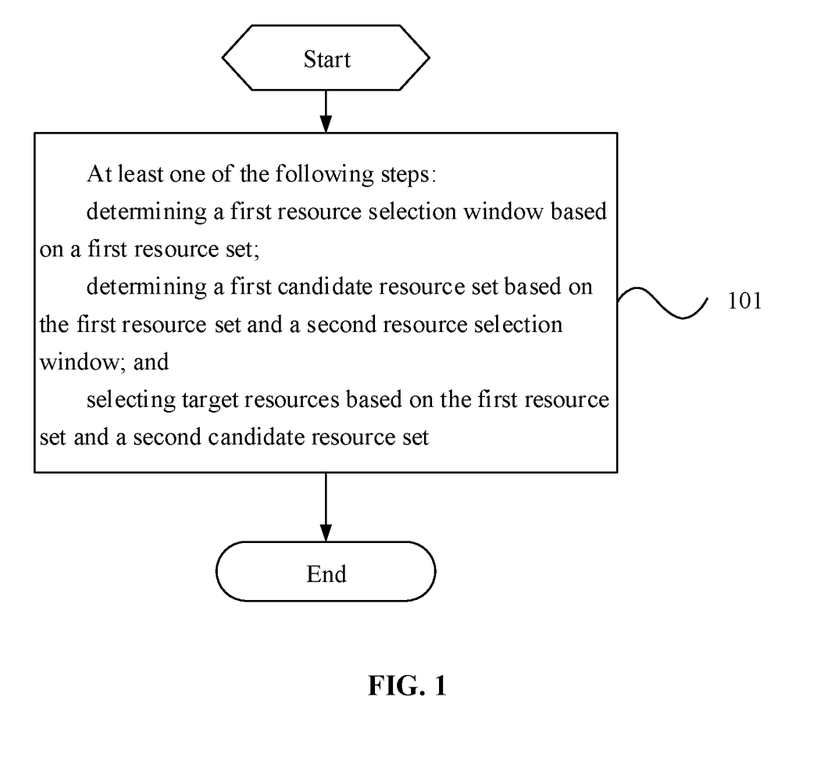
FIG. 1 is a schematic flowchart of a resource selection method according to an embodiment of the present invention.

As shown in FIG. 1, a resource selection method according to an embodiment of the present invention is applied to user equipment and includes at least one of the following steps in step 101:

determining a first resource selection window based on a first resource set;
determining a first candidate resource set based on the first resource set and a second resource selection window; and selecting target resources based on the first resource set and a second candidate resource set.

In the foregoing step 101, according to the method in this embodiment of the present invention, during resource selection, selection of the target resources may implemented by performing at least one of determining the first resource selection window based on the first resource set, determining the first candidate resource set based on the first resource set and the second resource selection window, and selecting the target resources based on the first resource set and the second candidate resource set. In this way, with the target resource selected by the user equipment based on the first resource set, more reliable transmission can be ensured.

In one embodiment, the user equipment UE to which the method in this embodiment of the present invention is applied may determine the first resource selection window based on the first resource set, and then select the target resource based on the first resource selection window. Alternatively, the first candidate resource set is determined based on the first resource set and the second resource selection window, and the target resource is then selected based on the first candidate resource set. Certainly, the second resource selection window may alternatively be the first resource selection window determined based on the first resource set. Alternatively, the target resource is selected based on the first resource set and the second candidate resource set. Certainly, the second candidate resource set may alternatively be the first candidate resource set determined based on the first resource set and the second resource selection window.

The first resource set may be preconfigured, or configured by a control node, or configured by a transmission node (for example, a peer device in transmission with the user equipment). The control node may be a base station, a group head of a UE group, a remote subscriber unit (RSU), a relay device relay UE, or the like. In one embodiment, the first resource set may be a sidelink bandwidth part (SL BWP) or part of resources in a resource pool, or may be in other forms.

It should be known that a resource selection window is a window with a length of T1 to T2 after resource selection, resource selection evaluation, or resource selection reevaluation is triggered, and T2 is greater than or equal to T1. Because T2 may be selected within a packet delay budget (PDB) of transport block (TB) transmission, an actual length and position of the resource selection window are determined by the UE, and the UE selects the resource selection window within a variable time range. The variable time range is hereinafter referred to as a variable range of the resource selection window.

Therefore, in this embodiment, optionally, in step 101, the determining a first resource selection window based on a first resource set includes:

if all or part of resources of the first resource set are included in a variable range of the first resource selection window, selecting the first resource selection window in at least one of the following manners:

the first resource selection window including at least first resources or part of the first resources;

the first resource selection window including only the first resources or only part of the first resources; and the first resource selection window not including the first resources; where the first resources are all resources of an overlapping portion between the variable range of the first resource selection window and a packet delay budget of transport block transmission.

Herein, in a case that the first resource selection window includes at least a portion of the first resource, optionally, the portion of the first resource is at least a first preset percentage such as x % of the first resource, so as to ensure that the portion of the first resource is at least a second preset percentage such as y % of the first resource selection window.

If resources of the first resource set are preferentially selected, the first resource selection window includes at least first resources or part of the first resources; or the first resource selection window includes only the first resources or only part of the first resources. If resources outside the first resource set are preferentially selected, the first resource selection window does not include the first resource.

However, in a case that the variable range of the first resource selection window does not include all or part of the resources of the first resource set, in this embodiment, optionally, in step 101, the determining a first resource selection window based on a first resource set include:

if none of the resources of the first resource set are included in the variable range of the first resource selection window, dropping current transport block transmission; or autonomously selecting a resource selection window within the variable range of the first resource selection window.

In one embodiment, implementation of autonomously selecting a resource selection window within the variable range of the first resource selection window may be: determining, based on a preset value, a lower limit T1 of the first resource selection window; and selecting one value within the PDB of TB transmission as an upper limit T2 of the first resource selection window.

In addition, it should be further known that determining of a candidate resource set is implemented through reference signal received power (RSRP) estimation on candidate resources in the resource selection window. The estimation is implemented based on an RSRP measurement result of resources corresponding to a resource monitoring window. Based on a comparison result between the estimated RSRP and a corresponding RSRP threshold, candidate resources whose estimated RSRP is greater than the RSRP threshold are excluded and not added to the candidate resource set. In addition, candidate resources in the candidate resource set need to be not less than a third preset percentage (for example, 20%) of all candidate resources in the resource selection window. If less than 20%, the RSRP threshold needs to be increased based on a step value (for example, 3 dB), and exclusion is further performed on the candidate resources until candidate resources being no less than the third preset percentage are selected for the candidate resource set. The candidate resource is a resource required for TB transmission, and the candidate resource may include one or more resource blocks. In sidelink transmission, the resource block usually includes one slot and one subchannel, or may be in other forms.

On a basis of a known first resource set, optionally, in step 101, the determining a first candidate resource set based on the first resource set and a second resource selection window includes:

in a case that all or part of resources of the first resource set are included in the second resource selection window, determining second resources and obtaining the first candidate resource set, based on at least one of the following information, where the first candidate resource set includes remaining candidate resources in the second resource selection window exclusive of the second resources:

an adjustment value of a first reference signal received power threshold;

an adjustment value of a step value of the first reference signal received power threshold;

an adjustment value of a first reference signal received power;

the first reference signal received power threshold;

a step value of the first reference signal received power threshold; and the first reference signal received power.

Herein, for the first candidate resource set, the first reference signal received power is obtained through RSRP estimation on candidate resources located in the second resource selection window, and the first reference signal received power threshold is a threshold used for comparison during exclusion of candidate resources. The step value of the first reference signal received power threshold is a step value used when the candidate resources of the first candidate resource set do not satisfy the third preset percentage. In this way, during determining of the second resources, at least one of the adjustment value of the first reference signal reception power threshold, the adjustment value of the first reference signal reception power, and the adjustment value of the step value of the first reference signal reception power threshold may be correspondingly adjusted to determine the second resource, so that the resulting first candidate resource set includes remaining candidate resources in the second resource selection window exclusive of the second resources. Certainly, during determining of the second resources, the first reference signal received power threshold, the step value of the first reference signal received power threshold, and the first reference signal received power may alternatively be not adjusted.

In a scenario where the resources of the first resource set are preferentially selected, the second resource may be determined in at least one of the following manners, to obtain the first candidate resource set that includes remaining candidate resources in the second resource selection window exclusive of the second resources: decreasing, by using the adjustment value of the first reference signal received power, a first reference signal received power of candidate resources overlapping the first resource set in the second resource selection window, that is, a value of the first reference signal received power minus the adjustment value of the first reference signal received power; increasing, by using the adjustment value of the first reference signal received power threshold, a first reference signal received power threshold of candidate resources overlapping the first resource set in the second resource selection window, that is, the first reference signal received power threshold plus the adjustment value of the first reference signal received power threshold; and increasing, by using the adjustment value of the step value of the first reference signal received power threshold, a step value of a first reference signal received power threshold of candidate resources overlapping the first resource set in the second resource selection window, that is, the step value of the first reference signal received power threshold plus the adjustment value of the step value of the first reference signal received power threshold. The overlapping with the first resource set includes that all or part of resources of the candidate resources are located in the first resource set.

In one embodiment, the candidate resource set is determined by performing RSRP estimation on the candidate resources located in the resource selection window, and then excluding candidate resources whose estimated RSRP is greater than the RSRP threshold from the candidate resource set. Candidate resources in the candidate resource set need to be not less than a third preset percentage (for example, 20%) of all candidate resources in the resource selection window. If less than the third preset percentage, the RSRP threshold needs to be increased based on a step value, and exclusion is further performed on the candidate resources until candidate resources being no less than the third preset percentage are selected for the candidate resource set. The estimated RSRP is the value of the first reference signal received power, or the value of the first reference signal received power minus the adjustment value of the first reference signal received power. The RSRP threshold is the first reference signal received power threshold, or the first reference signal received power threshold plus the adjustment value of the first reference signal received power threshold. The step value of the RSRP threshold is the step value of the first reference signal received power, or the step value of the first reference signal received power plus the adjustment value of the step value of the first reference signal received power threshold. The excluded candidate resources are collectively referred to as the second resources.

In this way, using determining of the second resources based on the adjustment value of the first reference signal received power as an example, for the candidate resources overlapping the first resource set in the second resource selection window, the estimated RSRP is the first reference signal received power minus the adjustment value of the first reference signal received power value. The estimated RSRP is compared with the first reference signal received power threshold, to determine the candidate resource whose estimated RSRP is greater than the first reference signal received power threshold as the second resource. Certainly, if the resources of the first candidate resource set need to be not less than the third preset percentage of the resources in the second resource selection window, the first reference signal received power threshold needs to be increased based on the step value of the first reference signal received power threshold, and exclusion is further performed on the candidate resources until candidate resources being no less than the third preset percentage are selected for the candidate resource set.

In a scenario where the resources outside the first resource set are preferentially selected, the second resource may be determined in at least one of the following manners, to obtain the first candidate resource set that includes remaining candidate resources in the second resource selection window exclusive of the second resources: increasing, by using the adjustment value of the first reference signal received power, a first reference signal received power of candidate resources overlapping the first resource set, that is, a value of the first reference signal received power plus the adjustment value of the first reference signal received power; decreasing, by using the adjustment value of the first reference signal received power threshold, a first reference signal received power threshold of candidate resources overlapping the first resource set, that is, the first reference signal received power threshold minus the adjustment value of the first reference signal received power threshold; and decreasing, by using the adjustment value of the step value of the first reference signal received power threshold, a step value of a first reference signal received power threshold of candidate resources overlapping the first resource set, that is, the step value of the first reference signal received power threshold minus the adjustment value of the step value of the first reference signal received power threshold. The overlapping the first resource set includes that all or part of resources of the candidate resources are located in the first resource set.

In one embodiment, the first candidate resource set is determined by performing RSRP estimation on the candidate resources located in the resource selection window, and then excluding candidate resources whose estimated RSRP is greater than the RSRP threshold from the candidate resource set. Candidate resources in the candidate resource set need to be not less than a third preset percentage (for example, 20%) of resources in the resource selection window. If less than the third preset percentage, the RSRP threshold needs to be increased based on a step value, and exclusion is further performed on the candidate resources until candidate resources being no less than the third preset percentage are selected for the candidate resource set. The estimated RSRP is the value of the first reference signal received power, or the value of the first reference signal received power plus the adjustment value of the first reference signal received power. The RSRP threshold is the first reference signal received power threshold, or the first reference signal received power threshold minus the adjustment value of the first reference signal received power threshold. The step value of the RSRP threshold is the step value of the first reference signal received power, or the step value of the first reference signal received power minus the adjustment value of the step value of the first reference signal received power threshold. The excluded candidate resources are collectively referred to as the second resources.

In this way, using determining of the second resources based on the adjustment value of the first reference signal received power as an example, for the candidate resources overlapping the first resource set in the second resource selection window, the estimated RSRP is the first reference signal received power plus the adjustment value of the first reference signal received power value. The estimated RSRP is compared with the first reference signal received power threshold, to determine the candidate resource whose estimated RSRP is greater than the first reference signal received power threshold as the second resource. Certainly, if the resources of the first candidate resource set need to be not less than the third preset percentage of the resources in the second resource selection window, the first reference signal received power threshold needs to be increased based on the step value of the first reference signal received power threshold, and exclusion is further performed on the candidate resources until candidate resources being no less than the third preset percentage are selected for the candidate resource set.

The adjustment value of the first reference signal received power threshold, the adjustment value of the step value of the first reference signal received power threshold, and the adjustment value of the first reference signal received power may be defined by a protocol, configured, or preconfigured.

In addition, in this embodiment, optionally, in step 101, the determining a first candidate resource set based on the first resource set and a second resource selection window includes:

in a case that all or part of resources of the first resource set are included in the second resource selection window, determining a third resource and obtaining the first candidate resource set, where the first candidate resource set includes remaining candidate resources in the second resource selection window exclusive of the third resources; and the third resources are resources in the second resource selection window that do not overlap the first resource set.

In this case, the first candidate resource set is also applicable to a scenario of preferentially selecting resources of the first resource set.

Furthermore, in this embodiment, optionally, in step 101, the determining a first candidate resource set based on the first resource set and a second resource selection window includes:

in a case that all or part of resources of the first resource set are included in the second resource selection window, determining fourth resources and obtaining the first candidate resource set, based on at least one of the following information, where the first candidate resource set includes remaining candidate resources in the second resource selection window exclusive of the fourth resources and fifth resources:

a second reference signal received power threshold;

a step value of the second reference signal received power threshold; and a second reference signal received power; where the fifth resources are resources in the second resource selection window that do not overlap the first resource set.

Herein, for the first candidate resource set, the second reference signal received power is obtained through RSRP estimation on candidate resources located in the second resource selection window, and the second reference signal received power threshold is a threshold used for comparison during exclusion of candidate resources. The step value of the second reference signal received power threshold is a step value used when the candidate resources of the first candidate resource set do not satisfy the third preset percentage.

In this case, the first candidate resource set is also applicable to a scenario of preferentially selecting resources of the first resource set.

In one embodiment, the first candidate resource set is determined by performing RSRP estimation on the candidate resources in the resource selection window exclusive of the fifth resources, and then excluding candidate resources whose estimated RSRP is greater than the RSRP threshold from the candidate resource set. Candidate resources in the candidate resource set need to be not less than a third preset percentage (for example, 20%) of resources in the resource selection window. If less than the third preset percentage, the RSRP threshold needs to be increased based on a step value, and exclusion is further performed on the candidate resources until candidate resources being no less than the third preset percentage are selected for the candidate resource set. The estimated RSRP is the second reference signal received power value, the RSRP threshold is the second reference signal received power threshold, the step value of the RSRP threshold is the step value of the second reference signal received power, and excluded candidate resources are collectively referred to as the fourth resources.

Moreover, for the first candidate resource set including remaining candidate resources in the second resource selection window exclusive of the fourth resources and the fifth resources, optionally, the first resources in the first candidate resource set account for no less than a first percentage.

the proportion of the first resources is a proportion of candidate resources in the first candidate resource set in candidate resources in the second resource selection window, or a proportion of candidate resources in the first candidate resource set in candidate resources in an overlapping portion between the second resource selection window and the first candidate resource set.

In addition, in this embodiment, optionally, in step 101, the determining a first candidate resource set based on the first resource set and a second resource selection window includes:

in a case that all or part of resources of the first resource set are included in the second resource selection window, determining sixth resources and obtaining the first candidate resource set, where the first candidate resource set includes remaining candidate resources in the second resource selection window exclusive of the sixth resources; and the sixth resources are resources in the second resource selection window that overlap the first resource set.

In this case, the first candidate resource set is applicable to a scenario of preferentially selecting resources outside the first resource set.

In this embodiment, optionally, in step 101, the determining a first candidate resource set based on the first resource set and a second resource selection window includes:

in a case that all or part of resources of the first resource set are included in the second resource selection window, determining seventh resources and obtaining the first candidate resource set, based on at least one of the following information, where the first candidate resource set includes remaining candidate resources in the second resource selection window exclusive of the seventh resources and eighth resources:

a third reference signal received power threshold;

a step value of the third reference signal received power threshold; and a third reference signal received power; where the eighth resources are resources in the second resource selection window that overlap the first resource set.

Herein, for the first candidate resource set, the third reference signal received power is obtained through RSRP estimation on candidate resources located in the second resource selection window, and the third reference signal received power threshold is a threshold used for comparison during exclusion of candidate resources. The step value of the third reference signal received power threshold is a step value used when the candidate resources of the first candidate resource set do not satisfy the third preset percentage.

In this case, the first candidate resource set is also applicable to a scenario of preferentially selecting resources outside the first resource set.

In one embodiment, the first candidate resource set is determined by performing RSRP estimation on the candidate resources in the resource selection window exclusive of the eighth resources, and then excluding candidate resources whose estimated RSRP is greater than the RSRP threshold from the candidate resource set. Candidate resources in the candidate resource set need to be not less than a third preset percentage (for example, 20%) of resources in the resource selection window. If less than the third preset percentage, the RSRP threshold needs to be increased based on a step value, and exclusion is further performed on the candidate resources until candidate resources being no less than the third preset percentage are selected for the candidate resource set. The estimated RSRP is the third reference signal received power value, the RSRP threshold is the third reference signal received power threshold, the step value of the RSRP threshold is the step value of the third reference signal received power, and excluded candidate resources are collectively referred to as the seventh resources.

Moreover, for the first candidate resource set including remaining candidate resources in the second resource selection window exclusive of the seventh resources and the eighth resources, optionally, the second resources in the first candidate resource set account for no less than a second percentage.

the proportion of the second resources are a proportion of candidate resources in the first candidate resource set in candidate resources in the second resource selection window, or a proportion of candidate resources in the first candidate resource set in candidate resources in a non-overlapping portion between the second resource selection window and the first candidate resource set.

In this embodiment, optionally, in step 101, the selecting target resources based on the first resource set and a second candidate resource set includes:

if the second candidate resource set includes candidate resources in the first resource set and candidate resources outside the first resource set, selecting the target resources from the second candidate resource set, where a probability of the candidate resources in the first resource set being selected as the target resources and/or a probability of the candidate resources outside the first resource set being selected as the target resources is a first value; or a preset condition is satisfied between the probability of the candidate resources in the first resource set being selected as the target resources and the probability of the candidate resources outside the first resource set being selected as the target resources.

Herein, the candidate resources in the first resource set indicate that all the resources of the candidate resources belong to the first resource set and/or part of the resources of the candidate resources belong to the first resource set; and candidate resources outside the first resource set are candidate resources other than the candidate resources in the first resource set.

The first value may be defined by the protocol, preconfigured, or configured by the control node, that is, the candidate resources in the first resource set are selected as a value of the probability of the target resource, and/or, the candidate resources outside the first resource set are selected as a value of the probability of the target resource. Certainly, a specific value of the probability may alternatively not be configured; instead, the two probabilities are configured to satisfy a preset condition. For example, a ratio of or a difference between the probability of the candidate resources in the first resource set being selected as the target resources and the probability of the candidate resources outside the first resource set being selected as the target resources may be defined by the protocol, preconfigured, or configured by the control node; or the probability of the candidate resources in the first resource set being selected as the target resources is n times the probability of the candidate resources outside the first resource set being selected as the target resource, where n is a positive number.

Preferably, in a scenario where the resources of the first resource set are preferentially selected, the probability of the candidate resources in the first resource set being selected as the target resources is greater than the probability of the candidate resources outside the first resource set being selected as the target resource; in a scenario where the resources outside the first resource set are preferentially selected, the probability of the candidate resources in the first resource set being selected as the target resources is less than the probability of the candidate resources outside the first resource set being selected as the target resources.

Certainly, if the probability of the candidate resources in the first resource set being selected as the target resources is 1, the target resource is selected from the candidate resources in the first resource set; if the probability of the candidate resources outside the first resource set being selected as the target resources is 1, the target resource is selected from the candidate resources outside the first resource set.

Moreover, in this embodiment, in a scenario where the resources of the first resource set are preferentially selected, a first proportion threshold may be further configured. When a proportion of the candidate resources in the first resource set in the candidate resources of the second candidate resource set is greater than the first proportion threshold, the target resource is selected from the candidate resources in the first resource set. In a scenario where the resources outside the first resource set are preferentially selected, a second proportion threshold may be further configured. When a proportion of the candidate resources outside the first resource set in the candidate resources of the second candidate resource set is greater than the second proportion threshold, the target resource is selected from the candidate resources outside the first resource set.

In this embodiment, considering a transmission requirement, optionally, the method further includes:
  in a case that a current data transmission is of a preset communication type, obtaining the first resource set and/or performing the step 101.

In this way, only in the scenario where the current data transmission is the preset communication type, the first resource set is obtained, and/or the step 101 is performed to select the target resource based on the first resource set, so as to implement more reliable transmission.

The preset communication type includes one or more of unicast, groupcast, and broadcast communication. In one embodiment, the preset communication type may alternatively be transmission specific to a link, a UE group, or a destination device identifier destination ID (for example, UE with a destination ID indicates the first resource set to TX UE).

The preset communication type may be defined by the protocol, configured by the control node, or preconfigured.

To sum up, according to the method in this embodiment of the present invention, during resource selection, selection of the target resources may be implemented by performing at least one of determining the first resource selection window based on the first resource set, determining the first candidate resource set based on the first resource set and the second resource selection window, and selecting the target resources based on the first resource set and the second candidate resource set. In this way, with the target resource selected by the user equipment based on the first resource set, more reliable transmission can be ensured.

Figure 2:
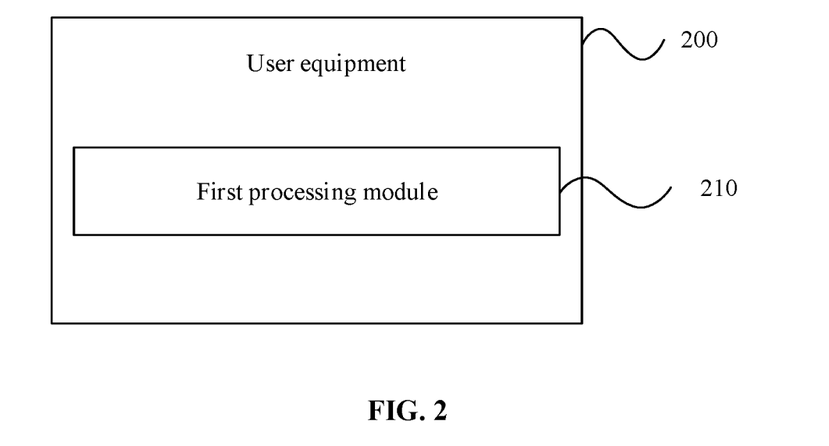
FIG. 2 illustrates user equipment according to an embodiment of the present invention.

FIG. 2 is a block diagram of user equipment according to an embodiment of the present invention. The user equipment 200 shown in FIG. 2 includes a first processing module 210.

The first processing module 210 is configured to perform at least one of the following steps:
  determining a first resource selection window based on a first resource set;
  determining a first candidate resource set based on the first resource set and a second resource selection window; and
  selecting target resources based on the first resource set and a second candidate resource set.

Optionally, the first processing module is further configured to:
  if all or part of resources of the first resource set are included in a variable range of the first resource selection window, select the first resource selection window in at least one of the following manners:
  the first resource selection window including at least first resources or part of the first resources;
  the first resource selection window including only the first resources or only part of the first resources; and
  the first resource selection window not including the first resources; where
  the first resources are all resources of an overlapping portion between the variable range of the first resource selection window and a packet delay budget of transport block transmission.

Optionally, the first processing module is further configured to:
  if none of the resources of the first resource set are included in the variable range of the first resource selection window, drop current transport block transmission; or autonomously select a resource selection window within the variable range of the first resource selection window.

Optionally, the first processing module is further configured to:
  in a case that all or part of resources of the first resource set are included in the second resource selection window, determine second resources and obtain the first candidate resource set, based on at least one of the following information, where the first candidate resource set includes remaining candidate resources in the second resource selection window exclusive of the second resources:
  an adjustment value of a first reference signal received power threshold;
  an adjustment value of a step value of the first reference signal received power threshold;
  an adjustment value of a first reference signal received power;
  the first reference signal received power threshold;
  a step value of the first reference signal received power threshold; and
  the first reference signal received power.

Optionally, the first processing module is further configured to:
  in a case that all or part of resources of the first resource set are included in the second resource selection window, determine a third resource and obtain the first candidate resource set, where the first candidate resource set includes remaining candidate resources in the second resource selection window exclusive of the third resources; and
  the third resources are resources in the second resource selection window that do not overlap the first resource set.

Optionally, the first processing module is further configured to:
  in a case that all or part of resources of the first resource set are included in the second resource selection window, determine fourth resources and obtain the first candidate resource set, based on at least one of the following information, where the first candidate resource set includes remaining candidate resources in the second resource selection window exclusive of the fourth resources and fifth resources:
  a second reference signal received power threshold;
  a step value of the second reference signal received power threshold; and a second reference signal received power; where
the fifth resources are resources in the second resource selection window that do not overlap the first resource set.

Optionally, a proportion of first resources in the first candidate resource set is not less than a first percentage; and
the proportion of the first resources is a proportion of candidate resources in the first candidate resource set in candidate resources in the second resource selection window, or a proportion of candidate resources in the first candidate resource set in candidate resources in an overlapping portion between the second resource selection window and the first candidate resource set.

Optionally, the first processing module is further configured to:
in a case that all or part of resources of the first resource set are included in the second resource selection window, determine sixth resources and obtain the first candidate resource set, where the first candidate resource set includes remaining candidate resources in the second resource selection window exclusive of the sixth resources; and
the sixth resources are resources in the second resource selection window that overlap the first resource set.

Optionally, the first processing module is further configured to:
in a case that all or part of resources of the first resource set are included in the second resource selection window, determine seventh resources and obtain the first candidate resource set, based on at least one of the following information, where the first candidate resource set includes remaining candidate resources in the second resource selection window exclusive of the seventh resources and eighth resources:
a third reference signal received power threshold;
a step value of the third reference signal received power threshold; and
a third reference signal received power; where
the eighth resources are resources in the second resource selection window that overlap the first resource set.

Optionally, a proportion of a second resource in the first candidate resource set is not less than a second percentage; and
the proportion of the second resources are a proportion of candidate resources in the first candidate resource set in candidate resources in the second resource selection window, or a proportion of candidate resources in the first candidate resource set in candidate resources in a non-overlapping portion between the second resource selection window and the first candidate resource set.

Optionally, the first processing module is further configured to:
if the second candidate resource set includes candidate resources in the first resource set and candidate resources outside the first resource set, select the target resources from the second candidate resource set, where a probability of the candidate resources in the first resource set being selected as the target resources and/or a probability of the candidate resources outside the first resource set being selected as the target resources is a first value; or a preset condition is satisfied between the probability of the candidate resources in the first resource set being selected as the target resources and the probability of the candidate resources outside the first resource set being selected as the target resources.

The user equipment further includes:
a second processing module, configured to: in a case that a current data transmission is of a preset communication type, obtain the first resource set.

The user equipment 200 is capable of implementing the processes implemented by the user equipment in the foregoing method embodiments in FIG. 1. To avoid repetition, details are not described herein again. During resource selection, the user equipment in this embodiment of the present invention may implement selection of the target resources by performing at least one of determining the first resource selection window based on the first resource set, determining the first candidate resource set based on the first resource set and the second resource selection window, and selecting the target resources based on the first resource set and the second candidate resource set. In this way, with the target resource selected by the user equipment based on the first resource set, more reliable transmission can be ensured.

Figure 3:
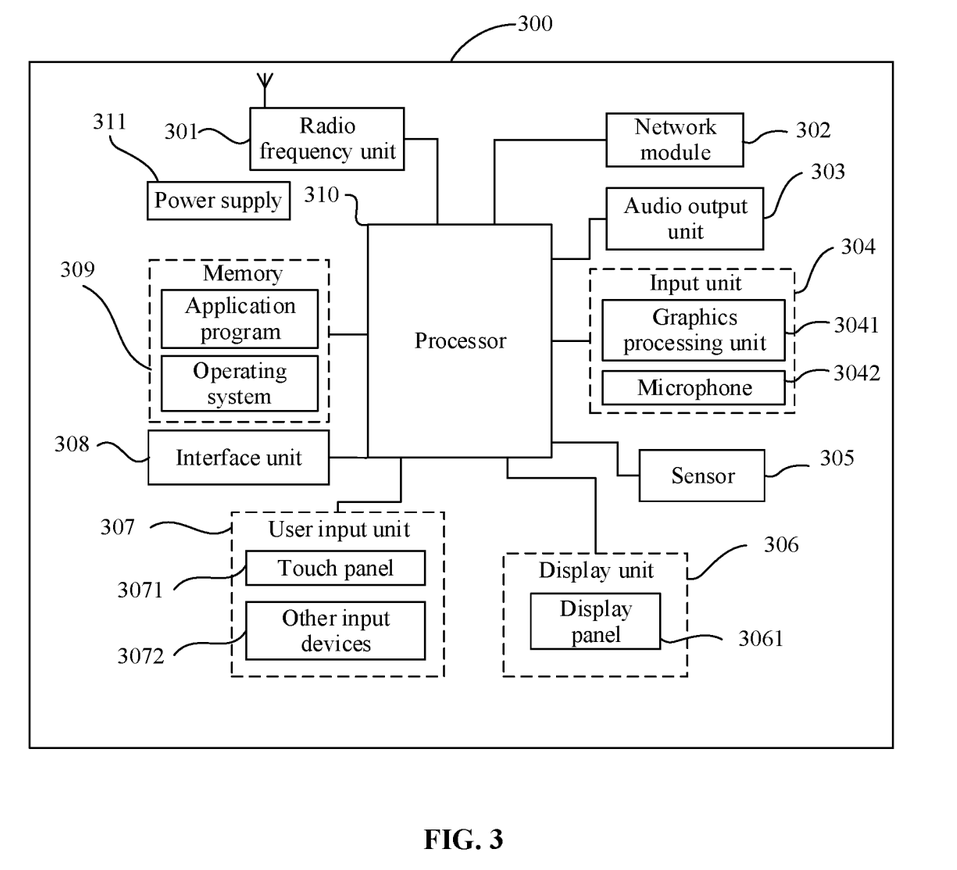
FIG. 3 illustrates user equipment according to another embodiment of the present invention.

FIG. 3 is a schematic structural diagram of hardware of user equipment for implementing the embodiments of the present invention. The user equipment 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art understands that the user equipment structure shown in FIG. 3 does not constitute any limitation on the user equipment. The user equipment may include more or fewer components than those shown in the figure, or some components may be combined, or the components may be disposed in different manners. In this embodiment of the present invention, the user equipment includes but is not limited to a mobile phone, a tablet computer, a laptop computer, a palmtop computer, an in-vehicle terminal, a wearable device, a pedometer, and the like.

The processor 310 is configured to perform at least one of the following steps:
determining a first resource selection window based on a first resource set;
determining a first candidate resource set based on the first resource set and a second resource selection window; and
selecting target resources based on the first resource set and a second candidate resource set.

It can be learned that during resource selection, the user equipment may implement selection of the target resources by performing at least one of determining the first resource selection window based on the first resource set, determining the first candidate resource set based on the first resource set and the second resource selection window, and selecting the target resources based on the first resource set and the second candidate resource set. In this way, with the target resource selected by the user equipment based on the first resource set, more reliable transmission can be ensured.

It should be understood that in this embodiment of the present invention, the radio frequency unit 301 may be configured to: receive and transmit signals in an information receiving/sending process or a call process; and in one embodiment, after receiving downlink data from a base station, transmit the downlink information to the processor 310 for processing, and in addition, transmit uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The user equipment provides a user with wireless broadband internet access through the network module 302, for example, helping the user to transmit and receive e-mails, browse web pages, and access streaming media.

The audio output unit 303 may convert audio data received by the radio frequency unit 301 or the network module 302 or stored in the memory 309 into an audio signal and output the audio signal as a sound. Furthermore, the audio output unit 303 may also provide audio output (for example, a call signal received sound or a message received sound) related to a specific function performed by the user equipment 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a still picture or a video obtained by an image capture apparatus (for example, a camera) in an image capture mode or a video capture mode. A processed image frame may be displayed on the display unit 306. The image frame processed by the graphics processing unit 3041 may be stored in the memory 309 (or another storage medium) or be transmitted by the radio frequency unit 301 or the network module 302. The microphone 3042 is capable of receiving sounds and processing such sounds into audio data. The processed audio data may be converted in a telephone call mode into a format that can be transmitted by the radio frequency unit 301 to a mobile communications base station, for outputting.

The user equipment 300 may further include at least one sensor 305, for example, an optical sensor, a motion sensor, and other sensors. In one embodiment, the optical sensor may include an ambient light sensor and a proximity sensor. The ambient light sensor may adjust luminance of the display panel 3061 based on brightness of ambient light, and the proximity sensor may turn off the display panel 3061 and/or backlight when the user equipment 300 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the user equipment, functions related to vibration recognition (such as pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided to the user. The display unit 306 may include a display panel 3061, and the display panel 3061 may be configured in a form of a liquid crystal display (LCD), an organic light-emitting diode (OLED), or the like.

The user input unit 307 may be configured to receive input digit or character information and generate key signal input related to user setting and function control of the user equipment. In one embodiment, the user input unit 307 may include a touch panel 3071 and other input devices 3072. The touch panel 3071 is also referred to as a touchscreen and can collect a touch operation (such as an operation performed by the user on the touch panel 3071 or near the touch panel 3071 with a finger or by using any proper object or accessory such as a stylus) of the user on or near the touch panel 3071. The touch panel 3071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 310, and can receive a command transmitted by the processor 310 and execute the command. In addition, the touch panel 3071 may be implemented in a plurality of forms, for example, as a resistive, capacitive, infrared, or surface acoustic wave touch panel. The user input unit 307 may further include the other input devices 3072 in addition to the touch panel 3071. In one embodiment, the other input devices 3072 may include but are not limited to a physical keyboard, a function key (such as a volume control key or an on/off key), a trackball, a mouse, and a joystick. Details are not described herein.

Further, the touch panel 3071 may cover the display panel 3061. When detecting a touch operation on or near the touch panel 3071, the touch panel 3071 transmits the touch operation to the processor 310 to determine a type of a touch event. Then, the processor 310 provides a corresponding visual output on the display panel 3061 based on the type of the touch event. Although in FIG. 3, the touch panel 3071 and the display panel 3061 act as two independent parts to implement input and output functions of the user equipment, in some embodiments, the touch panel 3071 and the display panel 3061 may be integrated to implement the input and output functions of the user equipment. This is not specifically limited herein.

The interface unit 308 is an interface between an external apparatus and the user equipment 300. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 308 may be configured to receive an input (for example, data information or power) from an external apparatus and transmit the received input to one or more elements within the user equipment 300, or may be configured to transmit data between the user equipment 300 and the external apparatus.

The memory 309 may be configured to store software programs and various data. The memory 309 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 309 may include a high-speed random access memory, and may further include a non-volatile memory such as at least one disk storage device, a flash memory device, or another volatile solid-state storage device.

The processor 310 is a control center of the user equipment, uses various interfaces and lines to connect parts of the entire user equipment, and executes various functions and processing data of the user equipment by running or executing software programs and/or modules stored in the memory 309 and invoking data stored in the memory 309, so as to perform overall monitoring on the user equipment. The processor 310 may include one or more processing units. Preferably, the processor 310 may integrate an application processor and a modem processor. The application processor mainly processes the operating system, a user interface, an application program, and the like. The modem processor mainly processes wireless communication. It can be understood that the modem processor may alternatively be not integrated in the processor 310.

The user equipment 300 may further include a power supply 311 (such as a battery) that supplies power to components. Preferably, the power supply 311 may be logically connected to the processor 310 through a power management system. In this way, functions such as charge management, discharge management, and power consumption management are implemented by using the power management system.

In addition, the user equipment 300 includes some functional modules that are not shown. Details are not described herein.

Preferably, an embodiment of the present invention further provides a mobile terminal, including a processor, a memory, and a computer program stored in the memory and capable of running on the processor. When the computer program is executed by the processor, the processes of the embodiment of the foregoing resource selection method can be implemented, with same technical effects achieved. To avoid repetition, details are not described herein again.

An embodiment of the present invention further provides a computer-readable storage medium, where a computer program is stored in the computer-readable storage medium. When the computer program is executed by a processor, the processes of the embodiment of the foregoing resource selection method can be implemented, with same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present invention.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The foregoing storage medium may be a magnetic disk, an optical disc, a read-only memory (ROM), a random access memory (RAM), or the like.

It can be understood that the embodiments described in this disclosure may be implemented by hardware, software, firmware, middleware, microcode, or a combination thereof. For hardware implementation, a module, a unit, a sub-unit, a sub-module, and the like may be implemented in one or more application specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure.

Software code may be stored in the memory and executed by the processor. The memory may be implemented in or outside the processor.

Some embodiments of the present invention have been described with reference to the attached drawings; however, the present invention is not limited to the aforesaid embodiments, and these embodiments are merely illustrative but are not intended to limit the present invention. Persons of ordinary skill in the art may further derive many other implementations according to the teachings of the present invention and within the scope defined in the claims, and all of the implementations shall fall within the scope of the present invention.

What is claimed is:

1. A resource selection method, performed by user equipment and comprising at least one of the following steps:
   determining a first resource selection window based on a first resource set;
   determining a first candidate resource set based on the first resource set and a second resource selection window; and
   selecting target resources based on the first resource set and a second candidate resource set,
   wherein, the determining a first candidate resource set based on the first resource set and a second resource selection window comprises:
   when all or part of resources of the first resource set are comprised in the second resource selection window, determining seventh resources and obtaining the first candidate resource set, based on at least one of the following information, wherein the first candidate resource set comprises remaining candidate resources in the second resource selection window exclusive of the seventh resources and eighth resources:
   a third reference signal received power threshold;
   a step value of the third reference signal received power threshold; or
   a third reference signal received power;
   wherein the eighth resources are resources in the second resource selection window that overlap the first resource set.

2. The method according to claim 1, wherein the determining a first resource selection window based on a first resource set comprises:
   if all or part of resources of the first resource set are comprised in a variable range of the first resource selection window, selecting the first resource selection window in at least one of the following manners:
   the first resource selection window comprising at least first resources or part of the first resources;
   the first resource selection window comprising only the first resources or only part of the first resources; or
   the first resource selection window not comprising the first resources; wherein
   the first resources are all resources of an overlapping portion between the variable range of the first resource selection window and a packet delay budget of transport block transmission.

3. The method according to claim 2, wherein the determining a first resource selection window based on a first resource set comprises:
   if none of the resources of the first resource set are comprised in the variable range of the first resource selection window, dropping current transport block transmission; or autonomously selecting a resource selection window within the variable range of the first resource selection window.

4. The method according to claim 1, wherein
   a proportion of a second resource in the first candidate resource set is not less than a second percentage; and
   the proportion of the second resources are a proportion of candidate resources in the first candidate resource set in candidate resources in the second resource selection window, or a proportion of candidate resources in the first candidate resource set in candidate resources in a non-overlapping portion between the second resource selection window and the first candidate resource set.

5. The method according to claim 1, wherein the selecting target resources based on the first resource set and a second candidate resource set comprises:
   if the second candidate resource set comprises candidate resources in the first resource set and candidate resources outside the first resource set, selecting the target resources from the second candidate resource set, wherein a probability of the candidate resources in the first resource set being selected as the target resources and/or a probability of the candidate resources outside the first resource set being selected as the target resources is a first value; or a preset condition is satisfied between the probability of the candidate resources in the first resource set being selected as the target resources and the probability of the candidate resources outside the first resource set being selected as the target resources.

6. The method according to claim 1, further comprising:
   when a current data transmission is of a preset communication type, obtaining the first resource set.

7. A user equipment, comprising a processor, a memory, and a computer program stored in the memory and capable of running on the processor, wherein the processor executes the computer program to perform:
   determining a first resource selection window based on a first resource set;
   determining a first candidate resource set based on the first resource set and a second resource selection window; and
   selecting target resources based on the first resource set and a second candidate resource set,
   wherein,
   the determining a first candidate resource set based on the first resource set and a second resource selection window comprises:
   when all or part of resources of the first resource set are comprised in the second resource selection window, determining seventh resources and obtaining the first candidate resource set, based on at least one of the following information, wherein the first candidate resource set comprises remaining candidate resources in the second resource selection window exclusive of the seventh resources and eighth resources:
   a third reference signal received power threshold;
   a step value of the third reference signal received power threshold; or
   a third reference signal received power;
   wherein the eighth resources are resources in the second resource selection window that overlap the first resource set.

8. The user equipment according to claim 7, wherein the determining a first resource selection window based on a first resource set comprises:
   if all or part of resources of the first resource set are comprised in a variable range of the first resource selection window, selecting the first resource selection window in at least one of the following manners:

the first resource selection window comprising at least first resources or part of the first resources;
the first resource selection window comprising only the first resources or only part of the first resources; or
the first resource selection window not comprising the first resources; wherein
the first resources are all resources of an overlapping portion between the variable range of the first resource selection window and a packet delay budget of transport block transmission.

9. The user equipment according to claim 8, wherein the determining a first resource selection window based on a first resource set comprises:
if none of the resources of the first resource set are comprised in the variable range of the first resource selection window, dropping current transport block transmission; or autonomously selecting a resource selection window within the variable range of the first resource selection window.

10. The user equipment according to claim 7, wherein, a proportion of a second resource in the first candidate resource set is not less than a second percentage; and
the proportion of the second resources are a proportion of candidate resources in the first candidate resource set in candidate resources in the second resource selection window, or a proportion of candidate resources in the first candidate resource set in candidate resources in a non-overlapping portion between the second resource selection window and the first candidate resource set.

11. The user equipment according to claim 7, wherein the selecting target resources based on the first resource set and a second candidate resource set comprises:
if the second candidate resource set comprises candidate resources in the first resource set and candidate resources outside the first resource set, selecting the target resources from the second candidate resource set, wherein a probability of the candidate resources in the first resource set being selected as the target resources and/or a probability of the candidate resources outside the first resource set being selected as the target resources is a first value; or a preset condition is satisfied between the probability of the candidate resources in the first resource set being selected as the target resources and the probability of the candidate resources outside the first resource set being selected as the target resources.

12. The user equipment according to claim 7, wherein the processor executes the computer program to perform further:
when a current data transmission is of a preset communication type, obtaining the first resource set.

13. A non-transitory computer-readable storage medium, wherein the computer-readable storage medium stores a computer program, and the processor executes the computer program to perform:
determining a first resource selection window based on a first resource set;
determining a first candidate resource set based on the first resource set and a second resource selection window; and
selecting target resources based on the first resource set and a second candidate resource set,
wherein the determining a first candidate resource set based on the first resource set and a second resource selection window comprises:
when all or part of resources of the first resource set are comprised in the second resource selection window, determining seventh resources and obtaining the first candidate resource set, based on at least one of the following information, wherein the first candidate resource set comprises remaining candidate resources in the second resource selection window exclusive of the seventh resources and eighth resources:
a third reference signal received power threshold;
a step value of the third reference signal received power threshold; or
a third reference signal received power;
wherein the eighth resources are resources in the second resource selection window that overlap the first resource set.

14. The non-transitory computer-readable storage medium according to claim 13, wherein the determining a first resource selection window based on a first resource set comprises:
if all or part of resources of the first resource set are comprised in a variable range of the first resource selection window, selecting the first resource selection window in at least one of the following manners:
the first resource selection window comprising at least first resources or part of the first resources;
the first resource selection window comprising only the first resources or only part of the first resources; or
the first resource selection window not comprising the first resources; wherein
the first resources are all resources of an overlapping portion between the variable range of the first resource selection window and a packet delay budget of transport block transmission.

15. The non-transitory computer-readable storage medium according to claim 14, wherein the determining a first resource selection window based on a first resource set comprises:
if none of the resources of the first resource set are comprised in the variable range of the first resource selection window, dropping current transport block transmission; or autonomously selecting a resource selection window within the variable range of the first resource selection window.

16. The non-transitory computer-readable storage medium according to claim 13, wherein, a proportion of a second resource in the first candidate resource set is not less than a second percentage; and
the proportion of the second resources are a proportion of candidate resources in the first candidate resource set in candidate resources in the second resource selection window, or a proportion of candidate resources in the first candidate resource set in candidate resources in a non-overlapping portion between the second resource selection window and the first candidate resource set.

17. The non-transitory computer-readable storage medium according to claim 13, wherein the selecting target resources based on the first resource set and a second candidate resource set comprises:
if the second candidate resource set comprises candidate resources in the first resource set and candidate resources outside the first resource set, selecting the target resources from the second candidate resource set, wherein a probability of the candidate resources in the first resource set being selected as the target resources and/or a probability of the candidate resources outside the first resource set being selected as the target resources is a first value; or a preset condition is satisfied between the probability of the candidate resources in the first resource set being selected as the target resources and the probability of the candidate resources outside the first resource set being selected as the target resources.

* * * * *